(12) United States Patent
Ma et al.

(10) Patent No.: US 7,706,386 B2
(45) Date of Patent: Apr. 27, 2010

(54) FAST 2-KEY SCHEDULER

(75) Inventors: Sha Ma, San Jose, CA (US); William Lynch, Mountain View, CA (US); Brian Alleyne, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1205 days.

(21) Appl. No.: 11/259,962

(22) Filed: Oct. 26, 2005

(65) Prior Publication Data

US 2007/0091797 A1   Apr. 26, 2007

(51) Int. Cl.
*H04L 12/56* (2006.01)

(52) U.S. Cl. .................... 370/395.42; 370/392

(58) Field of Classification Search ................ 370/408, 370/392, 395, 401, 402, 412, 351; 707/8, 707/104; 340/10
See application file for complete search history.

(56) References Cited

U.S. PATENT DOCUMENTS

| | | | | |
|---|---|---|---|---|
| 6,560,230 B1 * | 5/2003 | Li et al. | ................ | 370/395.42 |
| 7,325,071 B2 * | 1/2008 | Krishnan | ................... | 709/238 |
| 7,417,999 B1 * | 8/2008 | Charny et al. | ............... | 370/408 |
| 7,424,474 B2 * | 9/2008 | Nadj et al. | ...................... | 707/8 |
| 7,466,703 B1 * | 12/2008 | Arunachalam et al. | ...... | 370/392 |
| 2001/0007559 A1 * | 7/2001 | Le Pennec et al. | ......... | 370/392 |
| 2005/0237159 A1 * | 10/2005 | Cooper et al. | .............. | 340/10.5 |
| 2005/0249220 A1 * | 11/2005 | Olsen et al. | ............. | 370/395.4 |
| 2006/0004858 A1 * | 1/2006 | Tran et al. | ................ | 707/104.1 |
| 2006/0029080 A1 * | 2/2006 | Kappler et al. | ........... | 370/395.4 |

FOREIGN PATENT DOCUMENTS

WO   WO 01/29703 A1 * 10/2000

OTHER PUBLICATIONS

Valente, P., Exact GPS Simulation with Logarithmic Complexity, and its Application to an Optimally Fair Scheduler, SIGCOMM'04, Aug.-Sep. 2004, Portland OR, copyright 2004 ACM 1-58113-862-8/04/0008.

Stoica, I. and Abdel-Wahab, H., Earliest Eligible Virtual Deadline First: A Flexible and Accurate Mechanism for Proportional Share Resource Allocation, revised Jan. 26, 1996, TR-95-22 Old Dominion University, Norfolk, VA 1995.

\* cited by examiner

*Primary Examiner*—Kwang B Yao
*Assistant Examiner*—Syed Bokhari
(74) *Attorney, Agent, or Firm*—Charles E. Krueger (57) ABSTRACT

A scheduler utilizes a data structure in the form of an augmented, pruned, radix tree to implement 2-key scheduling.

19 Claims, 5 Drawing Sheets

A Radix Tree Implementation of Calendar

FIG. 1

Traversing a Radix Tree

FIG. 2

An Augmented Radix Tree Implementation of Calendar

FIG. 3

An Augmented Radix Tree after Service

FIG. 4

Topiary Tree at Time 1001

FIG. 5

Topiary Tree at Time 1010

FAST 2-KEY SCHEDULER

BACKGROUND OF THE INVENTION

A computer network may be viewed as a group of nodes connected by point-to-point communication channels. Each output channel of a node has a scheduler that selects packets to be transmitted through a channel associated with the scheduler.

Packets from different flows are stored in queues and the scheduler processes information associated with the head packet in each queue to determine which packet should be transmitted on the channel. The scheduler guarantees a minimum packet transmission rate to each queue where the sum of the guaranteed transmission rates must not be greater than the packet transmission rate of the channel. Thus, the packet transmission rate of the channel is much greater than the packet transmission rate guaranteed to any queue.

Packets are transmitted serially through the channel. When the channel is idle the scheduler selects a head packet from one of the queues, based on some priority scheme, and forwards it to the channel for transmission. Each queue has its packets transmitted as if it were the only source using a channel having a channel packet transmission rate equal to the guaranteed packet transmission rate of the queue.

Many schedulers utilize timestamps as the basis for scheduling packets to be transmitted. Time stamps may indicate the time at which a packet would finish transmitting if it were transmitted from the queue at the guaranteed packet transmission rate. For example, if a packet of length 5 reached the head of a queue at time 0, with the queue having a guaranteed packet transmission rate of 1, then the time stamp would be 5. In order for the channel to provide the guaranteed packet transmission rate it must complete transmitting the packet before a time value is equal to 5.

Schedulers may be implemented as binary search trees that have their leaf nodes populated by the time stamps of different head packets. A search of the nodes of the tree is required to determine which packet to schedule. Two-key search trees have also been used where the two keys are a start time and a finish time. For packets stored in a queue, the finish time of a preceding packet is the start time of a following packet.

Other data structures such as calendars can also be utilized as schedulers. A calendar has a series of time slots of a set precision for storing time stamps. For example, a calendar may have slots of width one second that would represent the sequence of times 1, 2, 3, . . . N. A time stamp equal to 1.5 would be stored in the "1" slot of the calendar.

Historically, the problem with calendars is lack of accuracy. In order to achieve the same kind of accuracy as a time stamp based scheduler, a calendar must have a large number of slots, each the size equivalent to the unit of time of the time stamp. For example, to match the accuracy of a 14-bit time stamp, the calendar needs 16K slots. This creates two problems. First, the number of time slots grows exponentially with accuracy (in number of equivalent time stamp bits), leading to impractical demand on storage associated with the calendar slots.

The other problem is that when the calendar slot is very granular the calendar can become sparsely populated. This leads to worst case O(N) operations to walk the calendar, where N is the number of slots. To deal with this problem, extra speedup mechanisms, such as a bit vector to represent slot occupancy, are often implemented in order to skip empty slots quickly.

Tree based schedulers generally search for an arbitrary key value, which requires serial access of the nodes and many operations. Calendar data structures generally require the size of memory to grow exponentially with accuracy, which limits their utility.

The challenges in the field of designing schedulers continue to increase with demands for more and better techniques having greater speed while reducing memory requirements. Therefore, a need has arisen for a new system and method for scheduling the transmission of packets.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

One embodiment of the present invention is a scheduler that utilizes a calendar of calendar of size=N that is indexed by a k bit number, $k=\log_2 N$. A binary radix tree is constructed based on the slot index number.

1. Each leaf node of the radix tree corresponds to a calendar slot and is identified by the slot's index;
2. The two adjacent leaf nodes that have identical (k−1) most significant index bits share a common parent node, which is identified by a (k−1) bit index number;
3. Each two adjacent parent nodes that have identical (k−2) most significant index bits share a common parent which is identified by a (k−2) bit index number;
4. Do this recursively until a level is reached where there are no more than 4 parent nodes.

Figure 1:
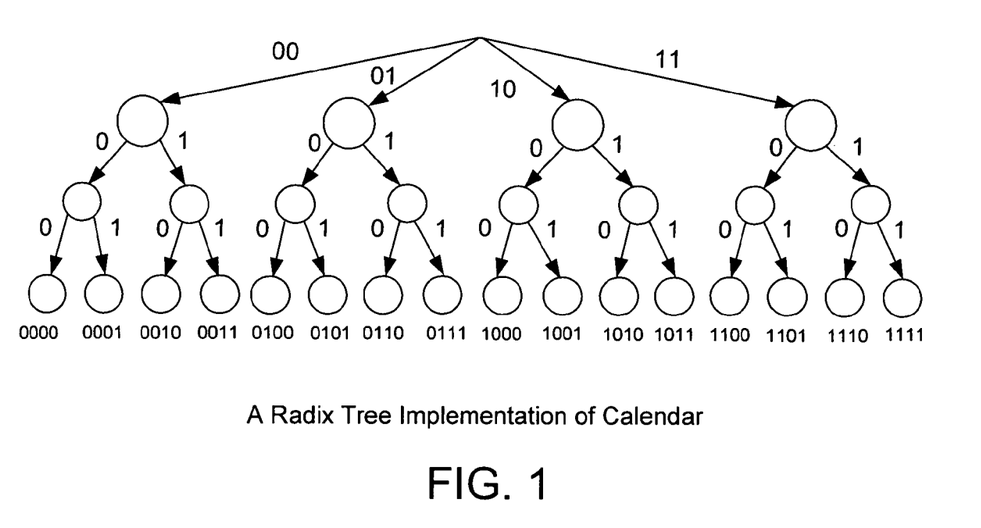
FIG. 1 depicts a radix tree implementation of a calendar.

FIG. 1 depicts the radix tree of a 16-slot calendar. The lowest level of the tree are leaf nodes corresponding to the calendar slots. Nodes other than leaf nodes are termed internal nodes. To uniquely identify each leaf and internal node in the radix tree the usual prefix notation is utilized. The root level nodes are identified as 00\*, 01\*, 10\*, and 11\*; the left child of 00\* is 000\*, its right child is 001\*, etc. The non-wildcard portion of a node's index is called the prefix. For example, 00 is the prefix of 00\*.

Figure 2:
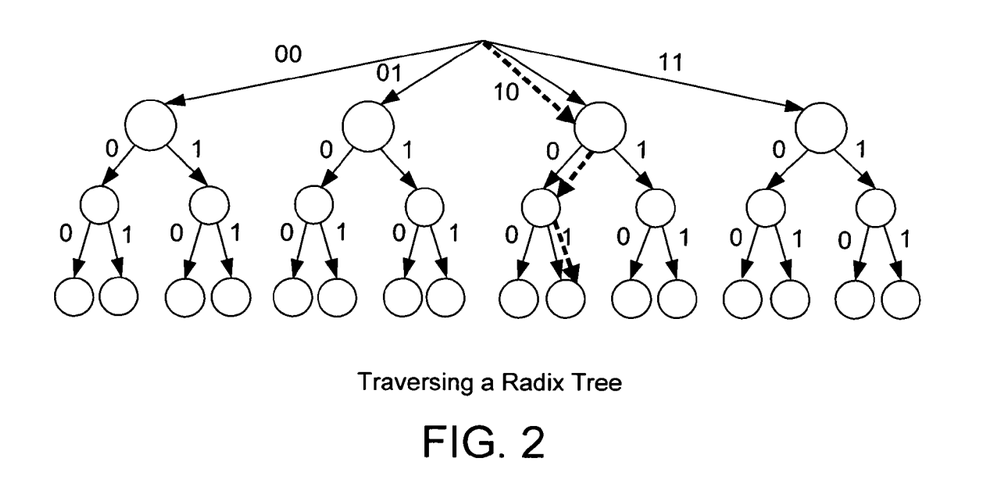
FIG. 2 depicts the operation of traversing a radix tree.

A counter value provided locally is the current time (CT). Traversing the radix tree is based on the calendar index. FIG. 2 depicts the path followed to find slot 1001. When the current time is 1001, all the active nodes to the left of or directly passed through by the highlighted path are eligible, while the nodes to the right are ineligible.

The present embodiment is a 2-key scheduler where the calendar is based on key_1, which is termed the eligibility key. A traffic class, e.g., the packets stored in a queue having a selected guaranteed packet transmission rate, are inserted into the leaf nodes corresponding to key_1. In the following description the packet start time is used as key_1. Thus, in FIG. 2 all nodes to the left of the highlighted path have start times less than the current time and are eligible to be selected for transmission. All nodes to the right have start times greater than the current time and are ineligible to be selected.

In this embodiment the radix tree is augmented with a heap. A heap is a data structure in the form of a complete binary tree with the property that the parent node always has a higher priority than its children. A second key, key_2, is the heap key that indicates the priority of a traffic class. In the following description the packet finish time is used as key_2.

The following steps are utilized to augment the radix tree of FIG. 1 with a heap:

A traffic class {key_1, key_2} is inserted into the leaf node corresponding to key_1;
Key_2 becomes the heap key for that node;
Similarly other nodes are populated with heap keys;
Key_2 of sibling nodes are compared; the smaller one is copied to the parent. This is done recursively until the nodes at the top level of the tree are populated with the smallest key_2 value in their respective subtrees.
An empty node has a key_2 value of NULL and loses to any other keys.

Figure 3:
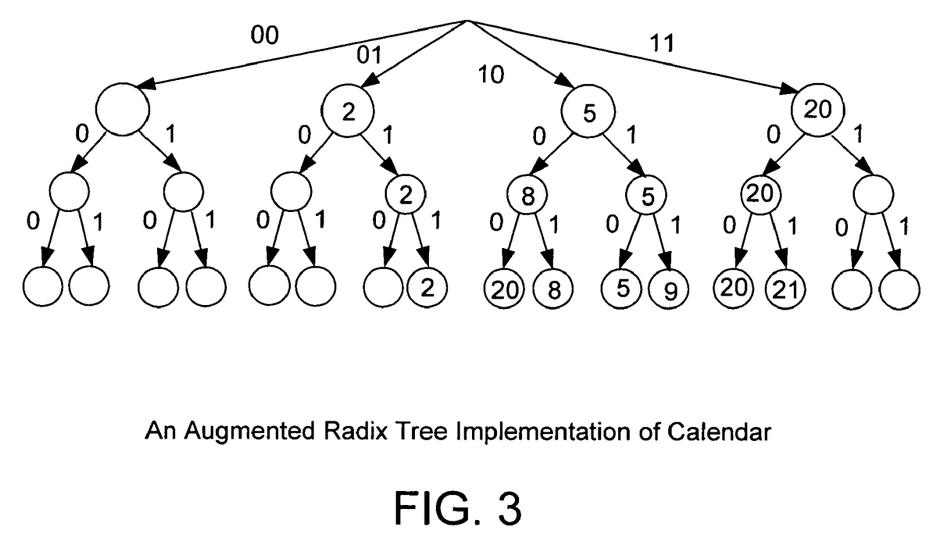
FIG. 3 depicts an augmented radix tree implementation of a calendar.

An example of a populated augmented radix tree is depicted in FIG. 3. In this embodiment, smaller values of key_2 have higher priority.

Suppose current time is 1001. The tree in FIG. 3 is traversed. When traversing the tree; a group of nodes in the same level are read in parallel;

All four root level nodes (00, 01, 10, and 11) are always fetched;
The two descendant nodes of 10* (100 and 101) are fetched;
The two descendant nodes of 100* (1000 and 1001) are fetched.

In FIG. 3 the root level nodes 01* and 10* have active keys. Both are on the eligible side of the current time, so the smaller key between them, 2, is picked. Root level node 11* also has an active key, but since it is ineligible, it is not considered. Since the winning key_2 (2) in node 01* actually came from node 0111, the key is removed from this leaf node as well as from any node from 0111 to the top of the tree (i.e., 011* and 01*). This requires the hierarchical nodes to store a pointer to the leaf node holding the winning key.

Figure 4:
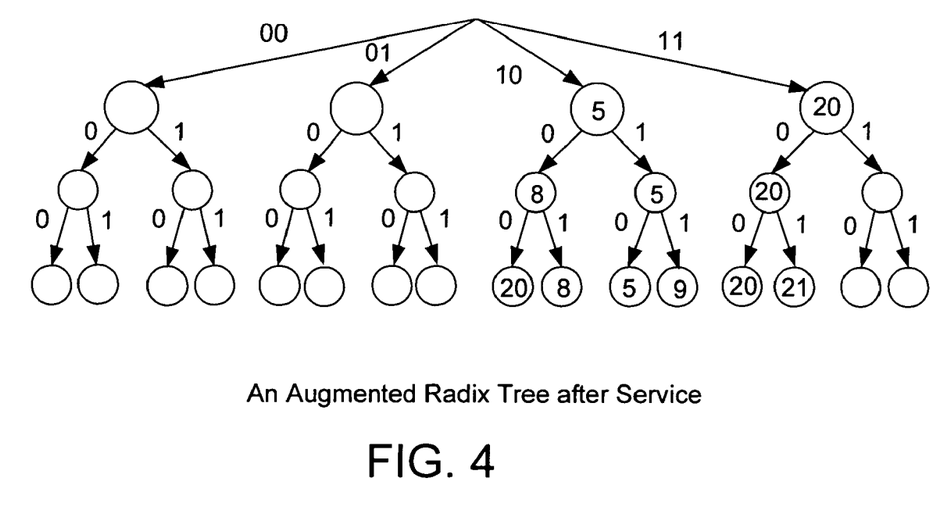
FIG. 4 depicts an augmented radix tree after service.

FIG. 4 depicts the augmented radix tree after servicing.

Suppose current time did not change (next service happens instantly). Now at the root level only node 10* is eligible. The tree is traversed along the path 1001, the information is in nodes 10*, **100*/101* and 1000/1001**.

Evaluating node 10*, key_2=5 is found. Although this is the best key_2 at this level, it cannot be picked it as it propagated from a node in the right side subtree which is ineligible, so 5 is eliminated and the best key from the left subtree is considered instead.
This leads to the root of the left side subtree, 100*. The key_2 value in this node, 8, belongs to a right side subtree. However this right side subtree is eligible, so 8 is accepted as the best pick. The job in node 1001 gets serviced.

The radix tree is static, it requires no explicit maintenance. All of the nodes in the tree are stored in fixed locations identified by their indices; no pointers are needed.

Tree nodes are addressed as follows, assuming the number of leaf nodes, N=2k:

A leaf node with index value of X[k−1:0] is stored in address location {1'b1, X};
An internal node with y bit prefix Y[y−1:0] and (k−y) bit wildcard is stored in location {(k−y+1)'b0, Y}.

Traversing the tree is fast. Since the nodal locations are fixed, all the nodes along a traversing path can be fetched in parallel. In the above example, that means root level nodes and **100*/101* and 1000/1001** are all fetched in parallel. This is in contrast to other binary search tree structures that must be traversed serially, because the nodes to fetch at the (n+1)th level can only be determined after the nth level is fully processed.

While the augmented radix tree can be scheduled with logN operations, its storage requirement makes it impractical to build. An embodiment will now be described that utilizes the concept of multi-precision calendaring and that allows pruning of the tree so that its storage requirement scales linearly with accuracy putting it on a par with time stamps.

The concept of a multi-precision calendar (MPC) will now be described.

The size of a calendar used to schedule traffic classes depends on two parameters, precision and range.

Precision defines the size of a calendar slot in the time domain—the higher the precision, the smaller the slot.
Range is determined by how much a time stamp can move after a service and by how much a time stamp can fall behind current time. For a traffic class, range is defined by its burst tolerance (BT), i.e., it is equal to [CT−BT, CT+BT] where CT is the Current Time. One measure of the BT of a class is the time required to transmit its Maximum Transmission Unit (MTU) at the guaranteed packet transmission rate of the class.

In a large scheduler with traffic classes of widely varying speeds, range is dictated by the slower classes while precision is dictated by the faster classes.

In this embodiment, different levels of time-domain precision are provided to traffic classes of different speeds without degrading WFI (Worst-case Fairness Index).

For fast traffic classes, small time slots=high level of time-domain precision, but small calendar range;
For slow traffic classes, large time slots=low level of time-domain precision, but large calendar range.
For any traffic class i, Burst tolerance (i)/timeslot size(i) <=C is maintained where C is a constant chosen by the user.

This is called multi-precision calendaring. With multi-precision calendaring, the eligibility aspect of scheduling (key_1) maintains a constant precision level, byte count-wise, across all traffic classes. For the sorting key (key_2), the full precision time stamp for all traffic classes is maintained. When traffic classes of widely varying speeds are simultaneously backlogged, this provides detailed interleaving and therefore smoother output.

In another embodiment, the MPC is applied to the augmented radix tree to reduce the storage requirement.

Each internal node therefore has a corresponding time slot. The time slot includes the time between the node's prefix and the prefix of the next node in the same level of the tree. For instance, the time slot of node 10* includes all time values>=1000 and <1100 (the prefix of the next node in the same level is 11*). In a binary tree, each higher level of the tree has a time slot double the size of the preceding level.

1. For illustration purposes the interpolation method is dropping fractions entirely, therefore all of the key_1 value falling into a time slot will be rounded down. For example, 1010 stored in 10\* will be rounded down to 1000 for key_1.
2. The slowest traffic class has the maximum burst tolerance, max(BT).
3. The fastest traffic class has the minimum burst tolerance, min(BT).
4. Assume the precision desired of any traffic class i complies to: BT[i]/precision[i]<=C, where C is a constant chosen by the user.

In this embodiment MPC allows the tree to be pruned because the calendar has the following properties:
1. The time slot size in the calendar, T=min(BT)/C;
2. The maximum range of a time stamp is max(BT), i.e., all valid time stamps are within a window of [CT−max (BT), CT+max(BT)] where CT is the current time;
3. The range in terms of number of time slots is 2\*(max (BT)/T);
4. Since the calendar is a timing wheel, it wraps around when time passes the last slot.
   To prevent aliasing, if all valid time stamps are in the window of size X than the calendar size should be 2X;
5. Therefore the number of slots in the calendar needs to be N=4\*max(BT)/T.

A binary radix tree for this calendar is built and the following rules are obeyed in order to populate the tree with traffic classes:
   A traffic class that has burst tolerance between [min(BT), 2\*min(BT)] is inserted into a leaf level node;
   A traffic class that has burst tolerance between [2\*min (BT), 4\*min(BT)] is inserted into a node in the parent level of leaf nodes;
   repeat this procedure until the slowest traffic class is inserted into a second-from top level node.

For a tree having these characteristics, at each level only a subset of nodes can be populated: the node that current time passes through (the current node), up to 2\*C sibling nodes to the left of the current node, and up to (2\*C−1) sibling nodes to the right of the current node.

This is proved as follows:
1. At the leaf level, a valid time stamp of a local traffic class falls between [CT−2\*min(BT), CT+2\*min(BT)) because the worst case burst tolerance of a traffic class inserted into this level is 2\*min(BT). The time slot size of leaf, T=min(BT)/C. Any node that is more than 2\*C nodes to the left of the node CT passes through corresponds to time <CT−2\*C\*T=CT−2\*min(BT), so it cannot be occupied by a traffic class that is inserted into this level node. Any node that is more than (2\*C−1) nodes to the right of the node CT passes through corresponds to time slots >CT+T+(2\*C−1)\*T=CT+2\*min(BT), so it cannot be occupied by a traffic class.
2. At the parent level of leaf nodes, local traffic class falls between [CT−4\*min(BT), CT+4\*min(BT)] because the worst case burst tolerance of a traffic class inserted into this level is 4\*min(BT). The local time slot size is 2T=2\*min(BT)/C. Any node that is more than 2\*C nodes to the left of current node is below CT−2\*C\*2T=CT−4\*min(BT), so it cannot be occupied. Similarly, any node more than (2\*C−1) nodes to the right of current node cannot be occupied.
3. By induction, each succeeding higher level of the tree has double the size of time slot, and double the size of maximum range of any local traffic classes. Therefore, no nodes outside of the 4\*C nodes centered on the current time can be occupied.

Figure 5:
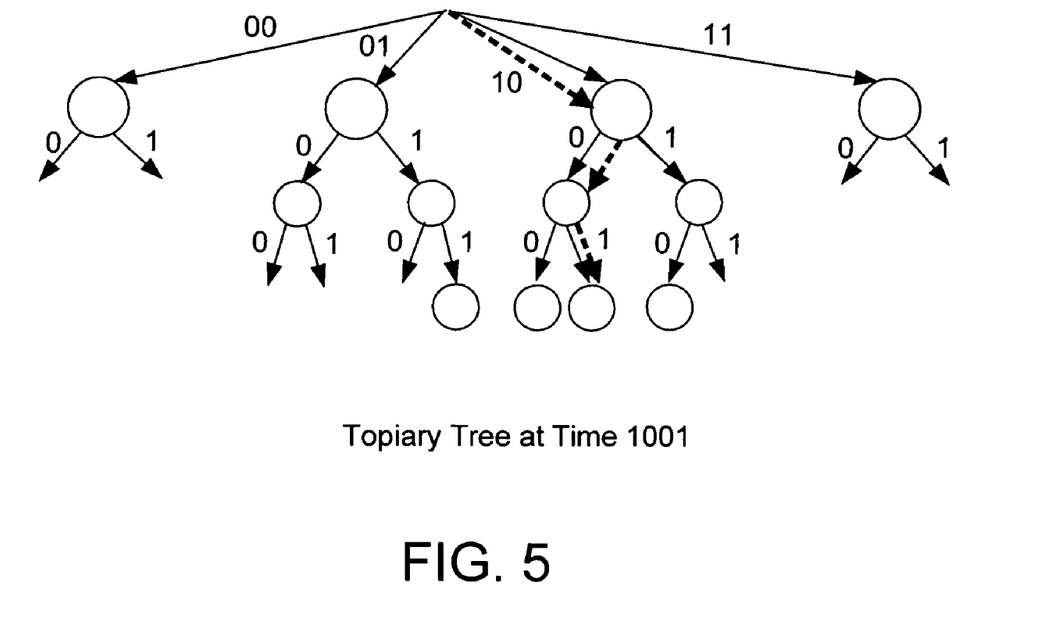
FIG. 5 depicts a topiary tree at time 1001.

Accordingly, only the 4\*C nodes centered on current time in each level of the tree need to be kept. All other nodes can be pruned. The result is a Topiary Tree. FIG. 5 is an example of the topiary tree of a 16-slot calendar with C=1 pruned so that storage space for only 4 slots are needed at the leaf level.

Since the basic calendar size is N slots, the tree depth is log$_2$N; the total size of a topiary tree is 4\*C\*log$_2$N. Logarithmic scaling with the size of the underlying calendar makes it practical to implement calendars matching the precision of other modern schedulers.

In the extreme cases C can be chosen to be 1, which means scheduling precision equals WFI. Selecting a higher value for C will not improve WFI, but will make shaped traffic smoother when most of the packets are smaller than MTU, so the user can trade off between the complexity of the data structure and the desired level of precision. With hardware assistance, usually a wider tree should be built. For instance, if the degree of the tree is 4, the tree has half the depth of the binary tree, and each level of the tree maps traffic classes of speeds ranging from 4:1. This gives some of them better precision than (BT[i]/C) for free. In fact, if the tree is so wide that it has only one level, each traffic class has the same precision in the time domain. Usually the degree of the tree is limited by how much parallel computation (a m-way parallel compare operation) is feasible for hardware.

Finally, the topiary tree is augmented with the heap structure based on key_2 as usual. Because all the nodes that are populated are maintained and NULL nodes have no effect in a heap, the resulting heap is identical to that of the full radix tree.

All the nodes in the tree are stored in fixed locations identified by their indices. Assuming the tree has k levels, the whole tree is stored in a 2-D array: Node_Type [k−1:0][4\*C−1:0] nodes. To address a node, first figure out which level it is in to address the array's first dimension; throw out log$_2$m MSBs from the prefix for each higher level in the tree, and use the remaining bits in the prefix to address the second dimension.

Since the topiary tree implements a timing wheel, it needs to be able to wrap around as time moves forward. This sections shows that no extra operation is necessary for rotation. The non-pruned nodes in each level of the tree are linked to certain nodes at the parent level depending on the current time; this only requires a computation at the time of sorting but no extra information to be stored explicitly.

Figure 6:
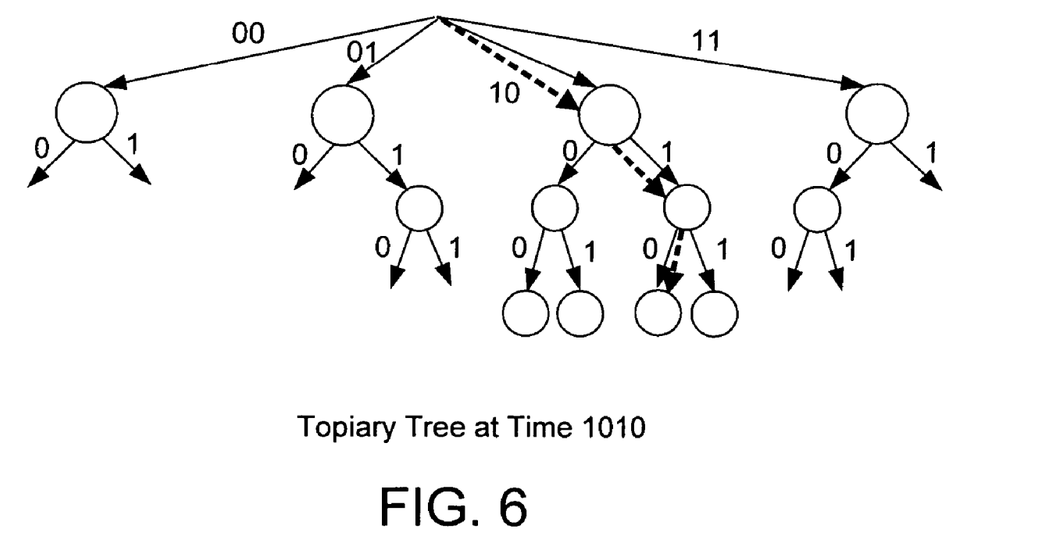
FIG. 6 depicts a topiary tree at time 1010.

FIG. 5 shows a tree at time 1001 and FIG. 6 depicts the rotated tree at time 1010.

Functionally, two nodes are moved: 010\* is moved to 110\*, and 0111 is moved to 1011. Essentially, these nodes have new parents; this does not require a physical move. A node rotation consists of two parts: detaching from the original parent, and attaching to the new parent. Both parts happen implicitly.

When current time moves from 1001 to 1010, the node 0111 moves outside of the valid time window. In a non-oversubscribed schedule, the traffic classes that are inserted into 0111 must have been serviced by now (falling below CT−BT means it is oversubscribed). Therefore node 0111 is already empty and propagating NULL to the parent node 011\*. Detaching this node has no effect on the parent node 011\*.

When the storage for node 0111 is attached to the new parent 101\* to represent the new time slot value 1011, it is in the future of current time and initially empty. Later when a traffic class is inserted into this slot, its key_2 value should be compared to 1010 and the parent node in the heap should be identified as 101\*(instead of 011\*). In other words, the insertion algorithm is allowed to determine a node's parent and siblings based on current time, but other than that nothing needs to be done.

When nodes move, the portion of their prefixes that identifies their position in the level never changes. For example, the last 2 bits of 0111 identify the node's location in the group of 4 siblings in level 3; when 0111 moves, it moves to 1011, and those 2 bits remain '2b11. Similarly, when 010\* moves to 110\*, the last 2 bits in the prefix portion of the index, 2'b10, do not change. This makes the storage addressing straightforward; each tree level is allocated 4*C locations, and each node's location is indexed by the minimum log (4*C) bits in the prefix. The nodes are stored in a static two dimensional array, the nodes may be rotating in the tree, but their addresses do not change.

Accordingly, an embodiment in the form of a topiary tree has been described, which is a radix tree pruned to support multi-precision calendaring. It is augmented to support 2-key scheduling. MPC reduces the storage requirement to a practical level even when high precision is required. The topiary tree achieves high performance when RAM access latency dominates computation time, making it a good candidate for high end platforms with hardware assistance. The current trend of memory technology makes more bandwidth available while the random access latency does not improve nearly as much. This shift is favorable to the topiary tree which is less sensitive to RAM access latencies.

Figure 7:
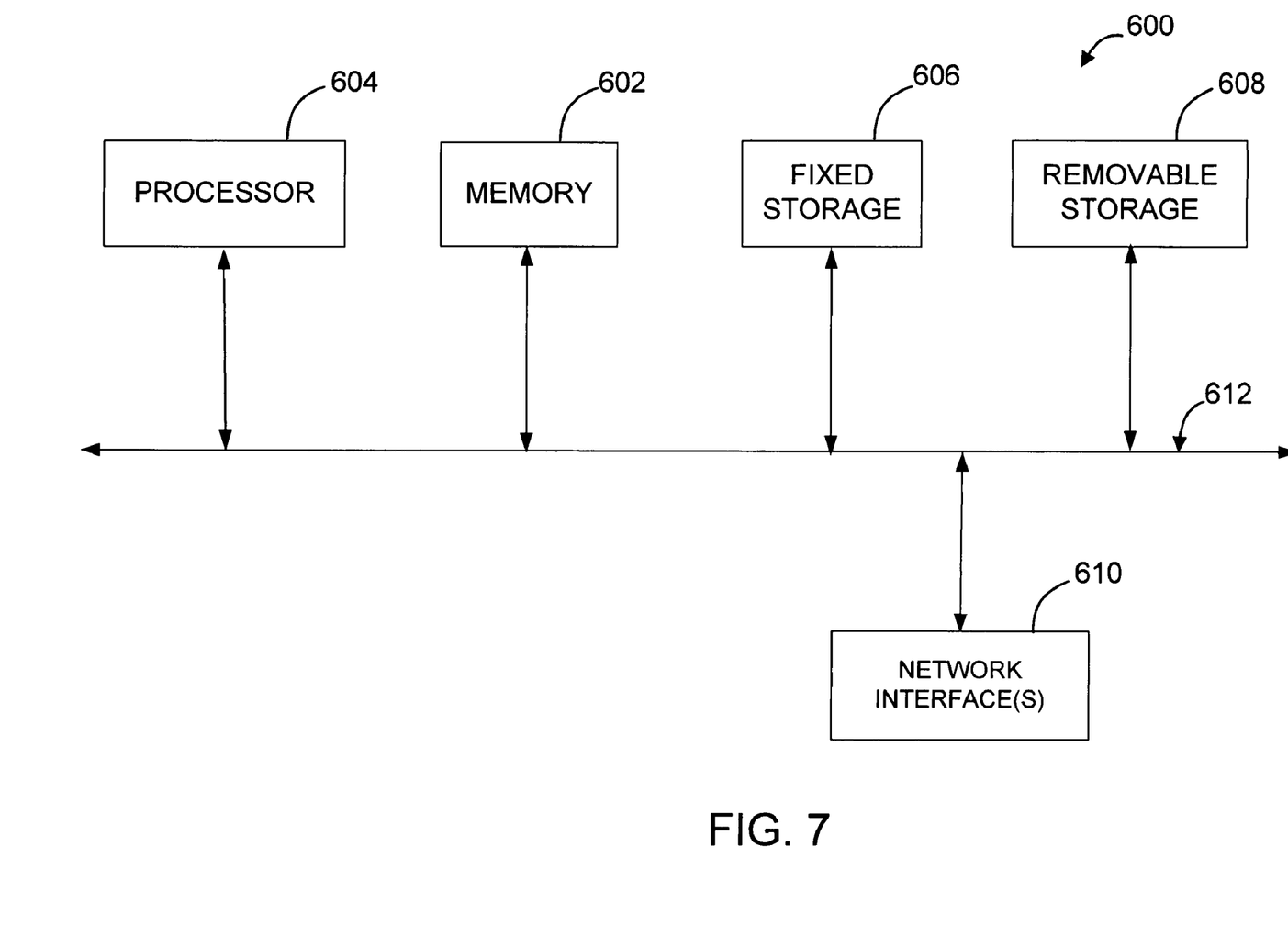
FIG. 7 depicts a computer system useful for implementing embodiments of the present invention.

FIG. 7 shows a system block diagram of computer system 600 that may be used to execute software of an embodiment of the invention. As is known in the art, FIG. 7 abstractly depicts a computer system that could be realized as ASIC or FPGA and be part of a router, switch, or other embedded system with network interface(s).

The computer system 600 includes memory 602 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave may be the computer readable storage medium. Computer system 600 further includes subsystems such as a central processor 604, fixed storage 606, removable storage 608, and one or more network interfaces 610. Other computer systems suitable for use with the invention may include additional or fewer subsystems.

The system bus architecture of computer system 600 is represented by arrow 612 in FIG. 7. However, these arrows are only illustrative of one possible interconnection scheme serving to link the subsystems. For example, a local bus may be utilized to connect the central processor 604 to the system memory 602. Computer system 600 shown in FIG. 7 is only one example of a computer system suitable for use with the invention. Other computer architectures having different configurations of subsystems may also be utilized. Communication between computers within the network is made possible with the use of communication protocols, which govern how computers exchange information over a network.

Figure 8:
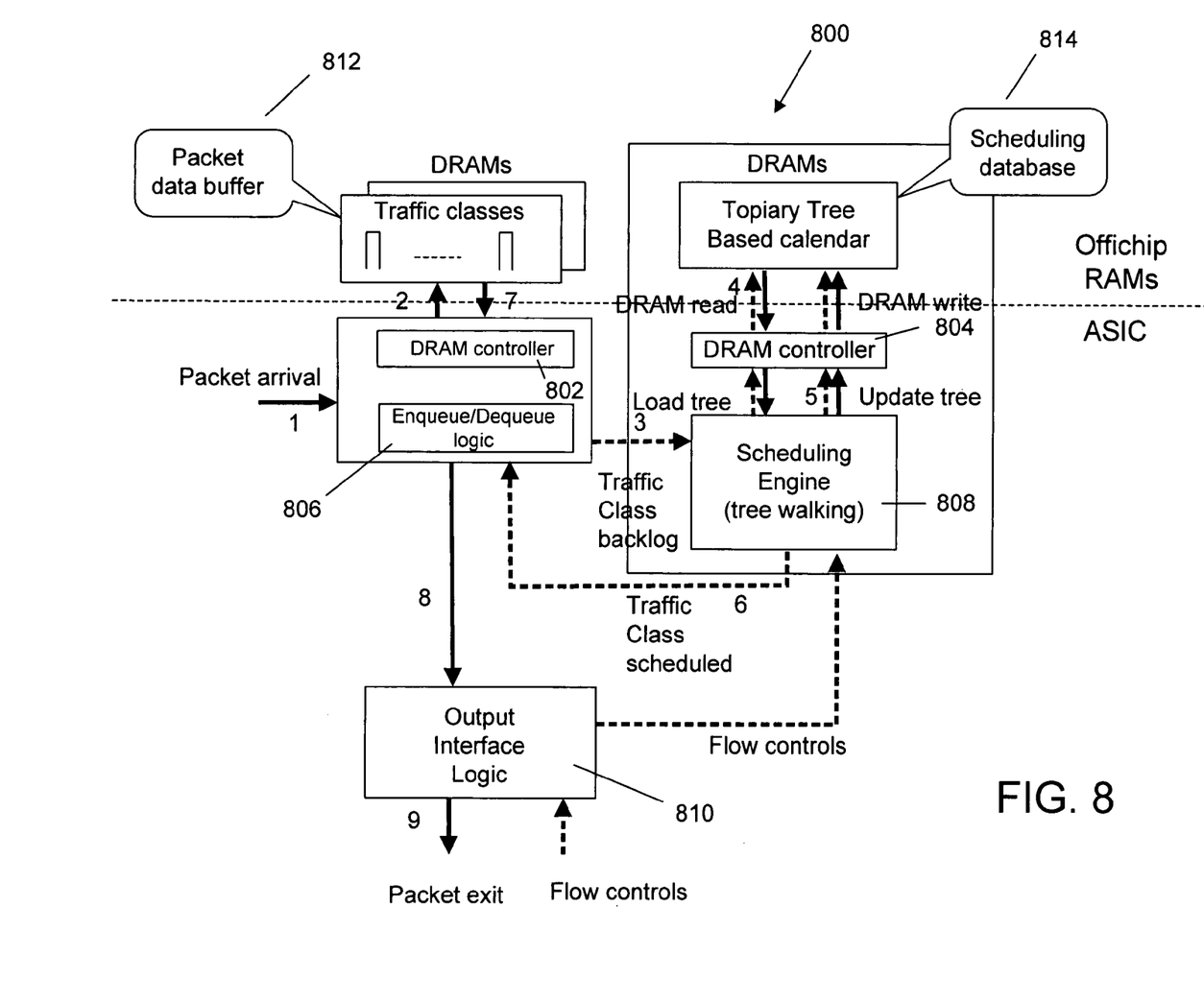
FIG. 8 is a block diagram of an embodiment implemented as an ASIC coupled to off-chip RAM.

FIG. 8 depicts an embodiment of the scheduler implemented as an Application Specific Integrated Circuit (ASIC) with surrounding circuitry. In FIG. 8, the functional units integrated in to ASIC 800 include First and Second DRAM Controllers 802 and 804, Enqueue/Dequeue Logic Block 806, a Scheduling Engine 808, and an Output Interface Block 810. A Packet Buffer 812 for holding Traffic Class queues is formed by a first set of off-chip DRAMs and a Scheduling Database 814 for holding the Topiary Tree Based Calendar data is formed by a second set of DRAMs.

The logical flow of the enqueue/schedule/dequeue process is indicated by the numbers on the drawings. When a packet in a flow arrives the Enqueue/Dequeue Logic Block 806 enqueues the packet in a traffic class queue according to its flow. (Steps 1 and 2). Subsequent to the scheduling of a packet the Enqueue/Dequeue Logic Block 806 passes the traffic class information of the new head packet in the traffic class queue, {key_1, key_2} in the above described embodiment, to the Scheduling Engine 808. (Step 3). The Scheduling Engine 808 then loads and updates the tree as described above. (Steps 4 and 5). The Scheduling Engine 808 then schedules the next packet to be transmitted and controls the Enqueue/Dequeue Logic Block 806 to dequeue the packet and forward it to the Output Interface Logic Block 810. (Steps 6-8). The Output Interface Logic Block 810 then transmits the packet over the channel. (Step 9).

The invention has now been described with reference to the preferred embodiments. Alternatives and substitutions will now be apparent to persons of skill in the art. For example, dedicated hardware, such as an Application Specific Integrated Circuit (ASIC), can be utilized to speed up certain operations. Accordingly, it is not intended to limit the invention except as provided by the appended claims.

What is claimed is:

1. A system for scheduling packets from different flows for transmission via a channel, said system comprising:
    a scheduling engine;
    a memory configured to store:
        a plurality of nodes, with each node identified by an index;
        tree structure information, associated with each node, determining parent, child, and sibling relationships to form calendar slots of a radix tree structure with multiple levels, with all nodes in a level being siblings, with a root level including no more than four nodes, with a leaf level including leaf nodes having no descendents;
        scheduling information in the form priority/eligibility keys held in each leaf node object, where the eligibility key held in a leaf node corresponds to the leaf node's index and the priority key indicates a priority level, and where the priority key indicating the highest priority of two adjacent nodes is copied to a parent node of the two adjacent nodes to augment the radix tree structure with a heap structure;
    with the scheduling engine configured to:
    queue packets from each flow;
    characterize each flow by a traffic class comprising key_1 and key_2;
    dequeue a traffic class into a node of a calendar represented by a radix tree having a plurality of levels, with the leaf nodes of the radix tree corresponding to time slots of the calendar with each leaf node identified by an index being a k bit number, where k is a positive integer, and with the radix tree recursively formed by assigning nodes having a set of identical most significant bits to a parent node having an index equal to the set of most significant bits, with the set most significant bits being the prefix of the parent node, where the leaf nodes define slots of maximum precision and each internal node corresponds to a slot that includes time between the nodes prefix and the prefix of the next node in the same level of the tree;
    for traffic classes with different burst tolerances, dequeue a traffic class with a minimum burst tolerance into the leaf nodes according to key_1, and inserting traffic classes with increasing burst tolerances into internal nodes of higher levels in the radix tree;

augment the radix tree with a heap to form an augmented radix tree by utilizing key_2 as the heap key for each node, populating other nodes with heap keys by recursively comparing the key_2 stored in sibling nodes and copying the key_2 of highest priority to the parent node until nodes in the top level of the radix tree are populated with the key_2 value having the highest priority of the their respective sub-trees;

prune the augmented radix tree to form a topiary tree with only 4C nodes disposed about a current time value are included in each level, where C is a constant and where for any traffic class the burst tolerance divided by the time slot size must be less than or equal to C;

detach a time-ineligible node from its current time-ineligible parent node and attach the time-ineligible node to a time-eligible parent node while maintaining a prefix portion of the time-ineligible node that identifies the location of the time-ineligible node in a group of siblings to wrap the topiary tree as the current time value moves forward; and select a node to service by fetching all root nodes, selecting a first eligible root node holding a key_2 of highest priority, fetching the descendents in the sub-tree of the eligible root node recursively until an eligible leaf node holding the highest priority key_2 is fetched which is serviced.

2. The system of claim 1 where:

the tree structure information determines that each parent node has two descendents, where two adjacent leaf nodes having first set identical (k-1) most significant bits share a common first level parent node identified by a parent index equal to the first set of identical (k-1) bits, where k is a positive integer, and with two adjacent first parent nodes identified by a set of identical (k-2) most significant bits sharing a commune second level parent node, and for any level assigning nodes having a set of identical most significant bits to a parent node having an index equal to the set of most significant bits, where the leaf nodes define slots of maximum precision and each internal node corresponds to a slot that includes time between the nodes prefix and the prefix of the next node in the same level of the tree; and and where for scheduling information for traffic classes with different burst tolerances, a traffic class with a minimum burst tolerance is held in the leaf nodes according to the eligibility key, and traffic classes with increasing burst tolerances are held in internal nodes of higher levels in the radix tree.

3. The system of claim 1 where:

the nodes are stored in two-dimensional array where for a given node the first array dimension is addressed by the level of the node and the second array dimension is addressed utilizing the index of the node; and the tree structure information is in the form of pointer information held in the nodes.

4. The system of claim 1 where: key_1 corresponds to a packet start time and key_2 corresponds to a packet finish time.

5. a method for scheduling packets from different flows for transmission via a channel, said method comprising: queuing, using an enqueue/dequeue logic block, packets from each flow; characterizing, using a processor, each flow by a traffic class comprising key_1 and key_2; dequeuing, using the enqueue/dequeue logic block, a traffic class into a node of a calendar represented by a radix tree having a plurality of levels, with the leaf nodes of the radix tree corresponding to time slots of the calendar with each leaf node identified by an index being a k bit number, where k is a positive integer, and with the radix tree recursively formed by assigning nodes having a set of identical most significant bits to a parent node having an index equal to the set of most significant bits, with the set most significant bits being the prefix of the parent node, where the leaf nodes define slots of maximum precision and each internal node corresponds to a slot that includes time between the nodes prefix and the prefix of the next node in the same level of the tree; for traffic classes with different burst tolerances, dequeuing, using the enqueue/dequeue logic block, a traffic class with a minimum burst tolerance into the leaf nodes according to key_1, and inserting traffic classes with increasing burst tolerances into internal nodes of higher levels in the radix tree; augmenting, using the processor, the radix tree with a heap to form an augmented radix tree by utilizing key_2 as the heap key for each node, populating other nodes with heap keys by recursively comparing the key_2 stored in sibling nodes and copying the key_2 of highest priority to the parent node until nodes in the top level of the radix tree are populated with the key_2 value having the highest priority of the their respective sub-trees; pruning, using the processor, the augmented radix tree to form a topiary tree with only 4C nodes disposed about a current time value are included in each level, where C is a constant and where for any traffic class the burst tolerance divided by the time slot size must be less than or equal to C; detaching, using the processor, a time-ineligible node from its current time-ineligible parent node and attaching the time-ineligible node to a time-eligible parent node while maintaining a prefix portion of the time-ineligible node that identifies the location of the time-ineligible node in a group of siblings to wrap the topiary tree as the current time value moves forward; and selecting, using the processor, a node to service by fetching all root nodes, selecting a first eligible root node holding a key_2 of highest priority, fetching the descendents in the sub-tree of the eligible root node recursively until an eligible leaf node holding the highest priority key_2 is fetched which is serviced.

6. The method of claim 5 further comprising: setting, using the processor, key_1 to the start time of a head packet in a queue; and setting, using the processor, key_2 to the finish time of the head packet in the queue.

7. the method of claim 6 further comprising: setting, using the processor, C=1 so that each level has four nodes.

8. The method of claim 5, with an augmented tree having level identified by M, where M is a positive integer and where m =0,1, . . . , M, where level 0 is the leaf node level and where min(BT) is the burst tolerance of the fastest traffic class, further comprising: inserting, using the processor, a traffic class that has a burst tolerance between $2^m$ min(BT) and $2^{m+1}$min(BT) in a node in the mth level to implement multi-precision calendaring.

9. the method of claim 5 further comprising the steps of: storing, using the processor, the nodes of a tree in a 2-dimensional array with a first dimension indexed by a nodes level and a second dimension indexed by a nodes prefix.

10. A system for scheduling packets from different flows for transmission via a channel, said system comprising:

means for queuing packets from each flow, with each flow characterized by a traffic class comprising key_1 and key_2;

means for dequeuing a traffic class into a node of a calendar represented by a radix tree having a plurality of levels, with the leaf nodes of the radix tree corresponding to time slots of the calendar with each leaf node identified by an index being a k bit number, where k is a positive integer, and with the radix tree recursively formed by assigning nodes having a set of identical most significant bits to a parent node having an index equal to the set of most significant bits, with the set most significant bits being the prefix of the parent node, where the leaf nodes define slots of maximum precision and each internal node corresponds to a slot that includes time between the nodes prefix and the prefix of the next node in the same level of the tree;

for traffic classes with different burst tolerances, means for dequeuing a traffic class with a minimum burst tolerance into the leaf nodes according to key_1, and inserting traffic classes with increasing burst tolerances into internal nodes of higher levels in the radix tree;

means for augmenting the radix tree with a heap to form an augmented radix tree by utilizing key_2 as the heap key for each node, populating other nodes with heap keys by recursively comparing the key_2 stored in sibling nodes and copying the key_2 of highest priority to the parent node until nodes in the top level of the radix tree are populated with the key_2 value having the highest priority of the their respective sub-trees;

means for pruning the augmented radix tree to form a topiary tree with only 4C nodes disposed about a current time value are included in each level, where C is a constant and where for any traffic class the burst tolerance divided by the time slot size must be less than or equal to C;

means for detaching a time-ineligible node from its current time-ineligible parent node and attaching the time-ineligible node to a time-eligible parent node while maintaining a prefix portion of the time-ineligible node that identifies the location of the time-ineligible node in a group of siblings to wrap the topiary tree as the current time value moves forward; and means for selecting a node to service by fetching all root nodes, selecting a first eligible root node holding a key_2 of highest priority, fetching the descendents in the sub-tree of the eligible root node recursively until an eligible leaf node holding the highest priority key_2 is fetched which is serviced.

11. The system of claim 10 further comprising:
means for setting key_1 to the start time of a head packet in a queue; and
means for setting key_2 to the finish time of the head packet in the queue.

12. The system of claim 11 further comprising:
means for setting C=1 so that each level has four nodes.

13. The system of claim 10, with an augmented tree having level identified by M, where M is a positive integer and where m=0, 1, . . . , M, where level 0 is the leaf node level and where min(BT) is the burst tolerance of the fastest traffic class, further comprising:
means for inserting a traffic class that has a burst tolerance between $2^m$ min(BT) and $2^{m+1}$min(BT) in a node in the mth level to implement multi-precision calendaring.

14. The system of claim 10 further comprising the steps of:
means for storing the nodes of a tree in a 2-dimensional array with a first dimension indexed by a nodes level and a second dimension indexed by a nodes prefix.

15. One or more computer readable storage media encoded with software comprising computer executable instructions and with the software operable to:
queue packets from each flow, with each flow characterized by a traffic class comprising key_1 and key_2;
dequeue a traffic class into a node of a calendar represented by a radix tree having a plurality of levels, with the leaf nodes of the radix tree corresponding to time slots of the calendar with each leaf node identified by an index being a k bit number, where k is a positive integer, and with the radix tree recursively formed by assigning nodes having a set of identical most significant bits to a parent node having an index equal to the set of most significant bits, with the set most significant bits being the prefix of the parent node, where the leaf nodes define slots of maximum precision and each internal node corresponds to a slot that includes time between the nodes prefix and the prefix of the next node in the same level of the tree;

for traffic classes with different burst tolerances, dequeue a traffic class with a minimum burst tolerance into the leaf nodes according to key_1, and inserting traffic classes with increasing burst tolerances into internal nodes of higher levels in the radix tree;

augment the radix tree with a heap to form an augmented radix tree by utilizing key_2 as the heap key for each node, populating other nodes with heap keys by recursively comparing the key_2 stored in sibling nodes and copying the key_2 of highest priority to the parent node until nodes in the top level of the radix tree are populated with the key_2 value having the highest priority of the their respective sub-trees;

prune the augmented radix tree to form a topiary tree with only 4C nodes disposed about a current time value are included in each level, where C is a constant and where for any traffic class the burst tolerance divided by the time slot size must be less than or equal to C;

detach a time-ineligible node from its current time-ineligible parent node and attach the time-ineligible node to a time-eligible parent node while maintaining a prefix portion of the time-ineligible node that identifies the location of the time-ineligible node in a group of siblings to wrap the topiary tree as the current time value moves forward; and select a first eligible root node holding a key_2 of highest priority, fetching the descendents in the sub-tree of the eligible root node recursively until an eligible leaf node holding the highest priority key_2 is fetched which is serviced.

16. The computer readable storage media of claim 15 encoded with software when executed further operable to:
set key_1 to the start time of a head packet in a queue; and
set key_2 to the finish time of the head packet in the queue.

17. The computer readable storage media of claim 16 encoded with software when executed further operable to:
set C=1 so that each level has four nodes.

18. The computer readable storage media of claim 15 encoded with software when executed further operable to:
insert a traffic class that has a burst tolerance between $2^m$ min(BT) and $2^{m+1}$min(BT) in a node in the mth level to implement multi-precision calendaring, with an augmented tree having level identified by M, where M is a positive integer and where m=0, 1, . . . , M, where level 0 is the leaf node level and where min(BT) is the burst tolerance of the fastest traffic class.

19. The computer readable storage media of claim 15 encoded with software when executed further operable to:
store the nodes of a tree in a 2-dimensional array with a first dimension indexed by a nodes level and a second dimension indexed by a nodes prefix.

* * * * *